(12) United States Patent
Schiphorst et al.

(10) Patent No.: US 10,197,072 B2
(45) Date of Patent: Feb. 5, 2019

(54) WASTE WATER AIR STOP VALVE

(71) Applicant: Driessen Aerospace Group N.V., Alkmaar (NL)

(72) Inventors: Remko Schiphorst, Enkhuizen (NL); Andreas Hoogeveen, Enkhuizen (NL)

(73) Assignee: Driessen Aerospace Group N.V., Alkmaar (NL)

( * ) Notice: Subject to any disclaimer, the term of this patent is extended or adjusted under 35 U.S.C. 154(b) by 0 days.

(21) Appl. No.: 15/786,817

(22) Filed: Oct. 18, 2017

(65) Prior Publication Data

US 2018/0106279 A1 Apr. 19, 2018

Related U.S. Application Data

(60) Provisional application No. 62/410,015, filed on Oct. 19, 2016.

(51) Int. Cl.
| | |
|---|---|
| *F15B 13/02* | (2006.01) |
| *B64D 11/02* | (2006.01) |
| *F16K 17/08* | (2006.01) |
| *F16K 17/164* | (2006.01) |
| *F16K 31/10* | (2006.01) |
| *F15B 15/14* | (2006.01) |
| *B64D 11/04* | (2006.01) |
| *F16K 31/26* | (2006.01) |
| *F16K 17/30* | (2006.01) |

(52) U.S. Cl.
CPC ............ *F15B 13/024* (2013.01); *B64D 11/02* (2013.01); *B64D 11/04* (2013.01); *F15B 13/025* (2013.01); *F15B 15/1447* (2013.01); *F16K 17/082* (2013.01); *F16K 17/164* (2013.01); *F16K 17/30* (2013.01); *F16K 31/10* (2013.01); *F16K 31/26* (2013.01); *Y10T 137/3294* (2015.04)

(58) Field of Classification Search
CPC .... F15B 13/04; F15B 13/025; F15B 15/1447; F16K 17/082; F16K 17/164; F16K 31/10; Y10T 137/3294; B64D 11/02; B64D 11/04

See application file for complete search history.

(56) References Cited

U.S. PATENT DOCUMENTS

| | | |
|---|---|---|
| 2,734,667 A | 2/1956 | Conklin |
| 4,275,755 A | 6/1981 | Foller et al. |
| | (Continued) | |

FOREIGN PATENT DOCUMENTS

| | | |
|---|---|---|
| DE | 2848128 | 2/1980 |
| EP | 1690789 | 8/2006 |
| | (Continued) | |

OTHER PUBLICATIONS

International Patent Application No. PCT/IB2017/056487, Search Report and Written Opinion dated Feb. 13, 2018.

*Primary Examiner* — Craig Schneider
*Assistant Examiner* — Kevin Barss
(74) *Attorney, Agent, or Firm* — Kilpatrick Townsend & Stockton LLP; Dean W. Russell; Kristin M. Crall

(57) ABSTRACT

Embodiments provide systems and methods for releasing grey water from an aircraft sink or sump using an improved waste water air stop valve. The valves described herein allow drainage of waste water, without air leakage. Additionally, if drainage in the piping is blocked, the valves are designed to ensure that water cannot flow back into the sinks or sumps.

19 Claims, 14 Drawing Sheets

(56) References Cited

U.S. PATENT DOCUMENTS

| | | | |
|---|---|---|---|
| 4,342,335 A | | 8/1982 | Reinicker |
| 4,713,847 A | | 12/1987 | Oldfelt et al. |
| 5,454,936 A | * | 10/1995 | Ask ................... B64D 11/02 |
| | | | 210/86 |
| 5,662,460 A | | 9/1997 | Modesitt |
| 7,118,677 B2 | * | 10/2006 | Hoffjann ............ B64D 11/02 |
| | | | 210/744 |
| 7,874,315 B2 | | 1/2011 | Jansen |
| 8,757,207 B2 | | 6/2014 | Doerr et al. |
| 9,404,246 B2 | * | 8/2016 | Yu ......................... E03D 1/32 |
| 2007/0102370 A1 | | 5/2007 | Hoffjann et al. |
| 2013/0312844 A1 | | 11/2013 | Burd |
| 2014/0305522 A1 | | 10/2014 | Reid et al. |

FOREIGN PATENT DOCUMENTS

| | | |
|---|---|---|
| EP | 2690015 | 1/2014 |
| GB | 865634 | 4/1961 |
| WO | 1993/005336 | 3/1993 |
| WO | 2012/049694 | 4/2012 |

\* cited by examiner

WASTE WATER AIR STOP VALVE

CROSS REFERENCE TO RELATED APPLICATIONS

This application claims the benefit of U.S. Provisional Application Ser. No. 62/410,015, filed Oct. 19, 2016, titled "Water Air Stop Valve," the entire contents of which are hereby incorporated by reference.

FIELD OF THE DISCLOSURE

Embodiments of the present disclosure relate generally to a valve system for use in aircraft operating at varied pressure conditions. The valve opens and closes at various pressure conditions in order to allow water to escape, but to prevent air leakage through the valve.

BACKGROUND

Aircraft are designed to operate at varied pressure conditions. When an aircraft is on the ground (or during takeoff, before it reaches flight altitude), pressure inside the aircraft cabin (cabin pressure) is generally equal to the pressure outside the aircraft cabin (environment pressure). During aircraft operation flight conditions, the cabin is pressurized with an overpressure compared to the outside environment. This regulated and controlled overpressure inside the cabin produces a difference in pressure (a "differential pressure") between inside the aircraft cabin and the outside atmosphere. The cabin pressure is higher than the environment pressure. This differential pressure can be used to generate a vacuum pressure on-board an aircraft for various functions.

For example, the differential pressure can be used to create a vacuum used for vacuum toilet operations. In other instances, the differential pressure can be used to drain one or more waste water systems of the aircraft. As background, grey waste water is often generated on board an aircraft. This water includes water or other liquids from sinks and sumps, generated in various aircraft modules such as galleys, lavatories, or any other locations on board an aircraft where water or other liquids can collect or drain. These systems are often connected to a drain mast, which leads to the outside environment. The drain mast releases the liquids to the external environment.

Because these systems are connected to the outside environment, without a valve or other air/water management system that interfaces between the system and the outside environment, the differential pressure would cause air leakage to occur. Air leakage also creates undesirable noise within the cabin. Accordingly, air stop valves have been used at the interface between the sink or sump and the drain mast in order to prevent these problems from occurring. These air stop valves typically use an internal membrane or disc to operate. In order to overcome the pressure differential and to force the membrane open and closed, a water column is required. The water column helps create a force that can cause opening of the membrane or disc. As illustrated by prior art FIG. 13, a pressure difference pulls a piston down with a force relative to the pressure difference. The water pressure of the column creates and opposite force which opens the membrane of the valve. The water pressure is created by an increase in the water level such that a higher pressure difference requires a larger water column. One downside of these current systems is that they require the presence of the water column, which requires additional installation height and space, as well as additional hoses in order to operate. In certain instances, the required installation height is not available. Accordingly, improved waste water air stop valves are thus desirable.

BRIEF SUMMARY

Embodiments of the invention described herein thus provide systems and methods for releasing grey water from an aircraft sink or sump using an improved waste water air stop valve. The valves described herein allow drainage of waste water, without air leakage. Additionally, if drainage in the piping is blocked, the valves are designed to ensure that water cannot flow back into the sinks or sumps.

In a first example, there is provided a waste water air stop valve, comprising: a housing comprising an inlet and an outlet; a movable valve body positioned to open or close the outlet, depending upon a pressure condition differential between the inlet and the outlet; the movable valve body comprising first and second openings, the first opening supporting a first piston and the second opening supporting a second piston, the first and second pistons associated via a member having a first end operably connected to the first piston and a second end operably connected to the second piston, wherein raised movement of the first end of the member causes raising of the first piston and lowering of the second piston, wherein raised movement of the second end of the bar causes raising of the second piston and lowering of the first piston; the member secured to a float at a securement point, the securement point positioned closer to the second end of the bar than the first; wherein fluid entering the inlet accumulates in a housing cavity until the fluid reaches a level that causes flotation of the float, wherein flotation of the float causes raising of the securement point end of the bar, causing raised movement of the second piston, wherein raised movement of the second piston allows fluid to flow past the second piston and through the outlet.

In either the preceding or subsequent examples, the second piston, the first piston, or both may have a channel therethrough. Fluid is allowed to pass via the first piston, the second piston, or both.

DETAILED DESCRIPTION

Embodiments of the present invention provide a waste water air stop valve 10. Various features are shown and described with reference to FIGS. 1-9. As shown, the valve features are enclosed by a housing 12. The housing 12 has an inlet 14 and an outlet 16. In use, liquid, water, or other fluids, enter the valve housing as the inlet 14. After traveling through the valve system as described below, fluid is allowed to exit at the outlet 16.

The valve 10 is positioned so that the inlet 14 is exposed to cabin pressure P1 and the outlet 16 is exposed a different pressure at some points of the valve operation. In some examples, the different pressure is vacuum generated by a vacuum generator onboard the aircraft. In other instances, the different pressure is created due a difference in the outside environment/atmosphere pressure P2 as compared to cabin pressure P1. As background, when an aircraft is at ground or sea-level (or otherwise closer to ground level than to flying altitudes), the cabin pressure equals (or is close to) the outside environment/atmosphere pressure. This is generally between about 10-12 psi, depending upon specific locations. At flying altitudes, however, aircraft must be pressurized in order to manage appropriate breathing air supply. For example, at about 18,000 feet, the atmospheric pressure drops to about 7.3 psi. At about 30,000 or 40,000 feet, the atmosphere provides less than about 4 psi pressure. At these great pressure differentials and without use of a valve designed to manage the interface between the cabin pressure and the outside environment/atmosphere pressure, there would be a constant leakage of air, with associated noise. Accordingly, as outlined below, the valve 10 described herein may be positioned so that the inlet 14 cooperates with a conduit between a sink or sump, and so that the outlet 16 cooperates with a conduit exposed to the outside environment/atmospheric pressure. When the valve 10 is opened, exiting fluid may be routed to the aircraft drain mast. When the valve 10 is closed, various portions of the valve still operate to allow fluid to exit the valve, but prevent movement of air therethrough.

Figure 1:
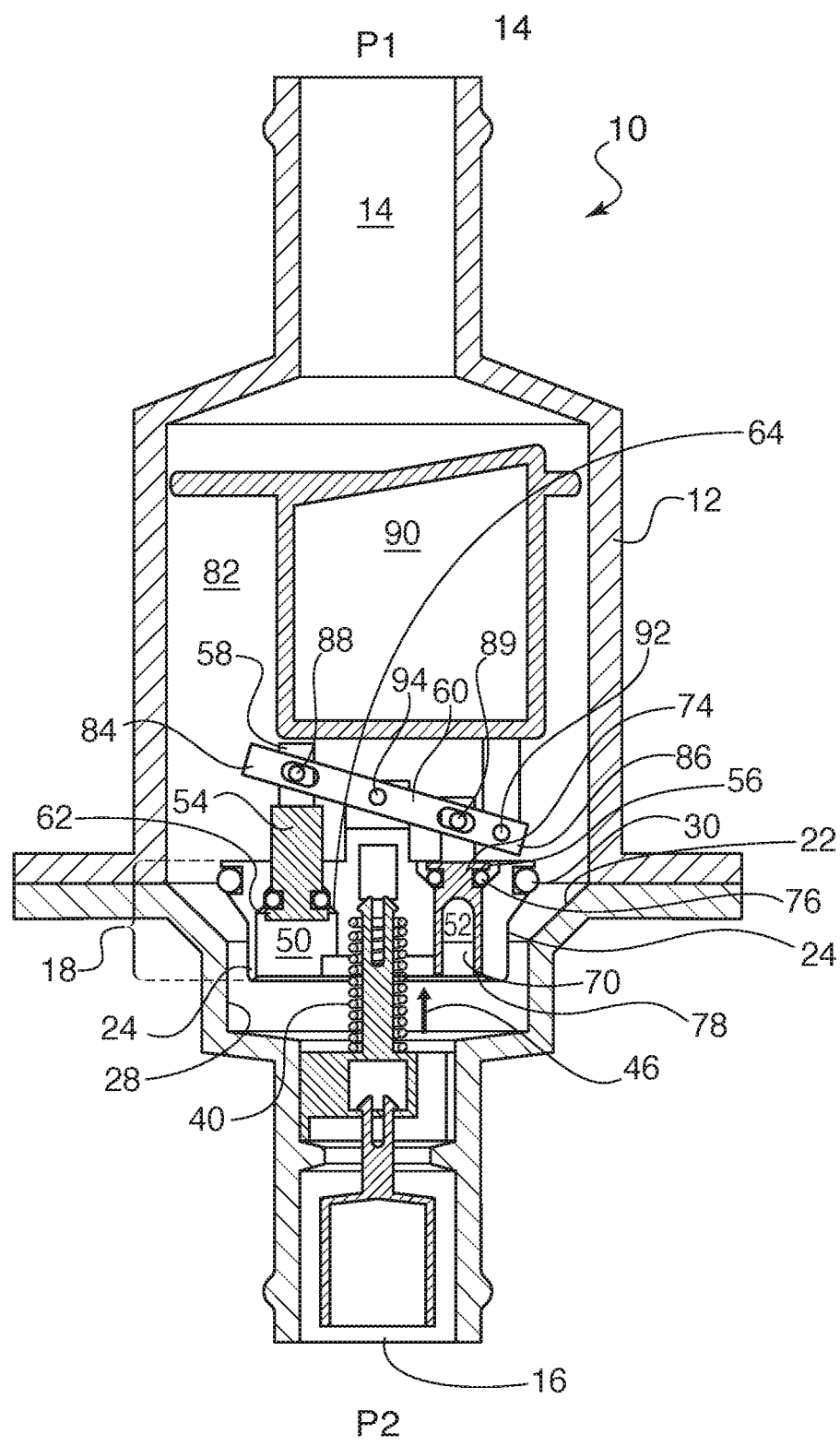
FIG. 1 shows a cross-sectional view of a waste water air stop valve according to this disclosure.
Figure 2:
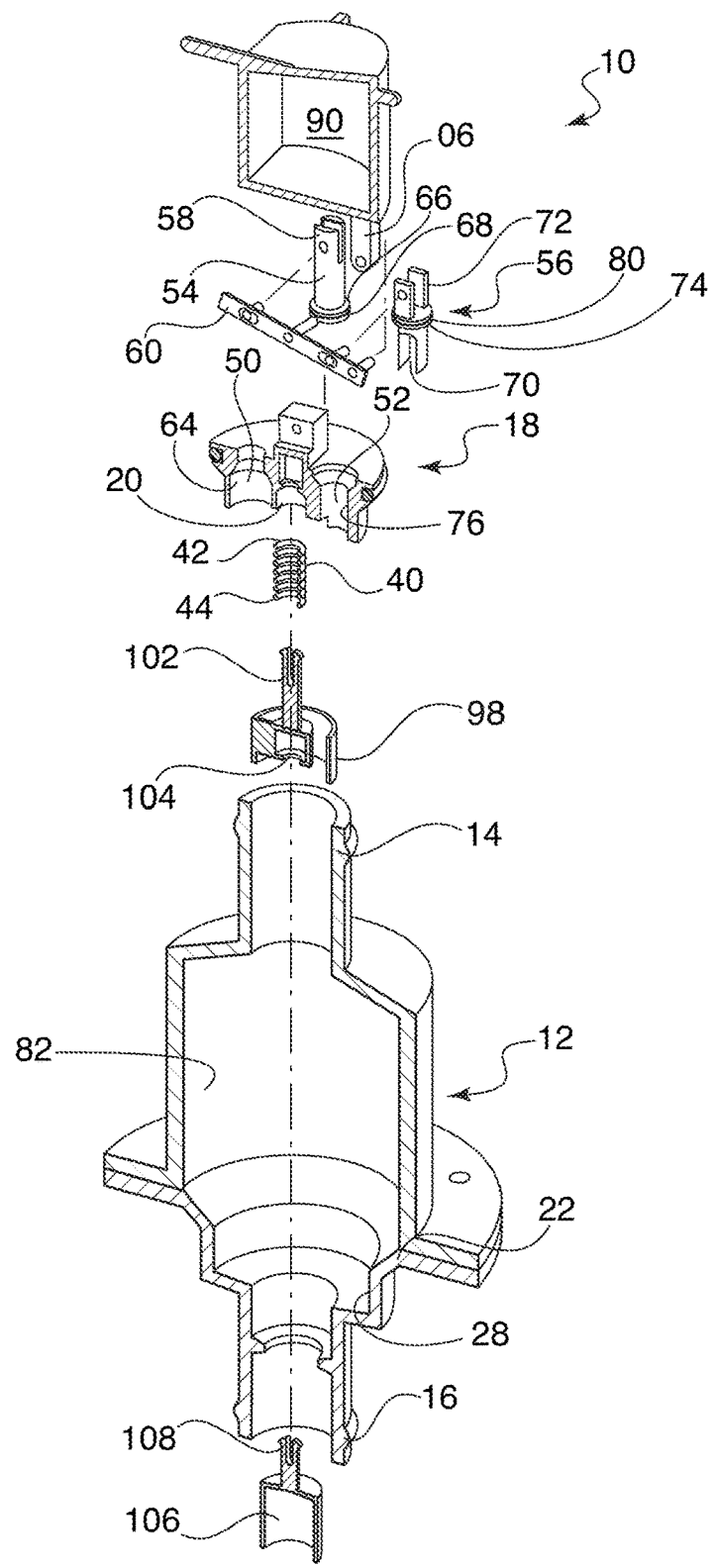
FIG. 2 shows an exploded perspective view of the waste water air stop valve of FIG. 1.

Referring now to FIGS. 1 and 2, a movable valve body 18 is generally positioned so that it can open or close the outlet 16. When the pressure at the inlet (P1) is the same as the pressure at the outlet (P2), P1=P2, or when the pressure differential is generally small, the movable valve body 18 is in an open position, as shown by FIG. 1. This is generally the situation when an aircraft is at ground level (or close to ground level), such that pressure at both the inlet and the outlet are equal or close to equal.

In one embodiment, the movable valve body 18 is associated with a spring 40. A first end 42 of the spring 40 is shown as cooperating with a spring cooperating portion 20 of the movable valve body 18. The spring cooperating portion 20 may be internal to the movable valve body 18. In other examples, the spring cooperating portion 20 may be external to the movable valve body 18. A second end 44 of the spring 40 is shown as cooperating with support 98. Support functions to hold the spring 40 in place and transfer the force of the spring to the housing 12. This force is what pushes the movable valve body 18 away from the housing 12 when there is not a large pressure differential across P1 and P2. In some examples, the support 98 may be bonded, clamped, fixed or otherwise secured with respect to the movable valve body 18 upon installation. The general goal is that the spring 40 applies pressure against the movable valve body 18 when P1=P2. The natural resting extension position of the spring 40 applies an upward pressure on the movable valve body 18, as illustrated by arrow 46 in FIG. 1. (As used herein, the terms "up," "upward," "down," or "downward" are used in relation to the figures on the page and the expected positioning of the valve in an aircraft. It should be understood however, that the valve 10 may be inverted or otherwise moved in use, depending upon the in-flight position of the aircraft.) This spring pressure on the movable valve body 18 keeps the valve body 18 (and its associated sealing member 30) raised away from the lower ledge 22 of the housing 12. The spring may be any appropriate material, such as metal, silicone, plastic, rubber, or an combination thereof. It should be understood that although a spring 40 is shown and described, other energy compression systems may be used to maintain the movable valve body 18 in an upward/unseated position when P1=P2. For example, opposed magnets may be used to force opening and closing movement of the movable valve body 18. In other examples, a hydraulic and/or pneumatic plunger/piston may be used.

Figure 3:
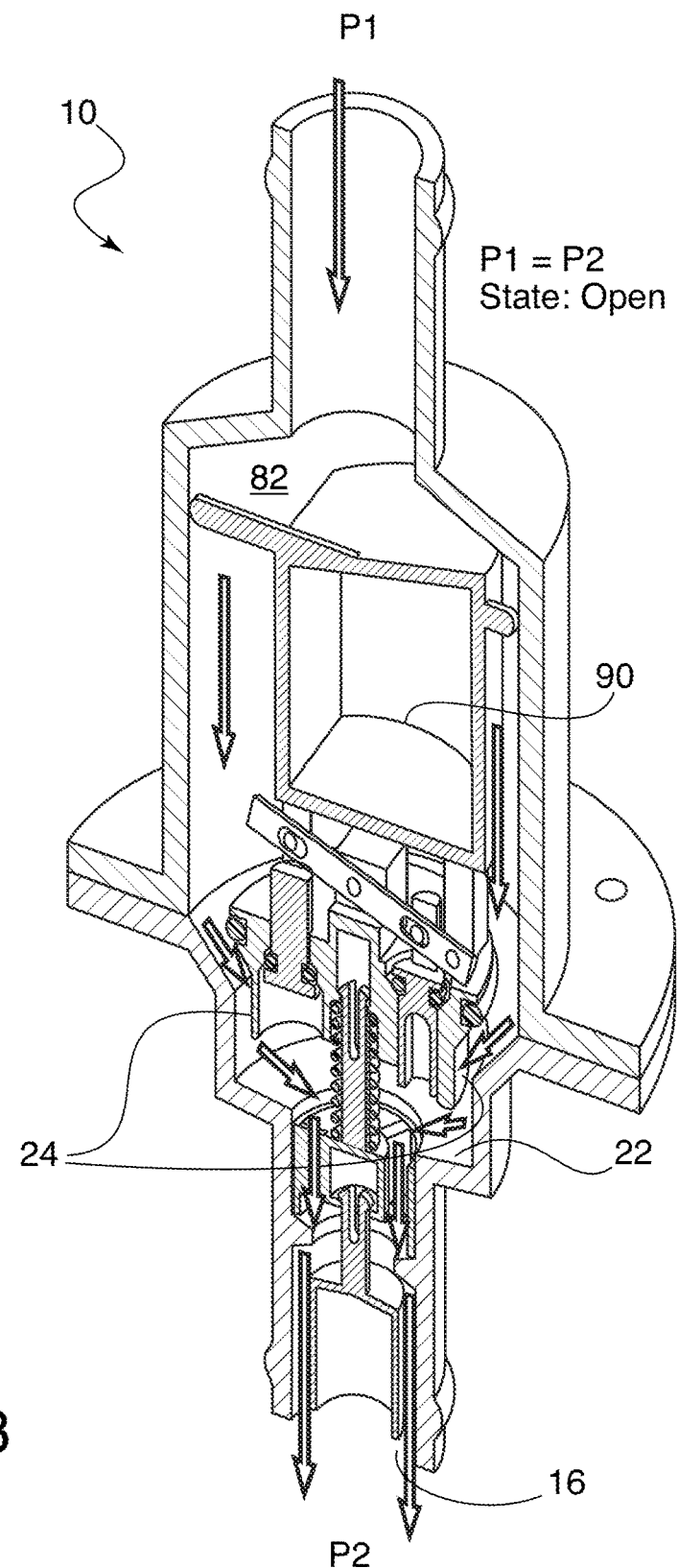
FIG. 3 shows a side perspective cutaway view of a waste water air stop valve at neutral pressure, where P1=P2.

This upward/unseated position allows any liquid entering the valve inlet 14 to flow past sides 24 of the movable valve body 18, past lower walls 28 of the housing, and out through the outlet 16. This water flow is illustrated by FIG. 3. This is the position of the valve 10 when the aircraft is on the ground or when the cabin pressure and the environment pressure are otherwise generally the same. This open position allows fluid and gas to pass. Fluid that is poured into the sink to drain directly through the valve 10.

Figure 4:
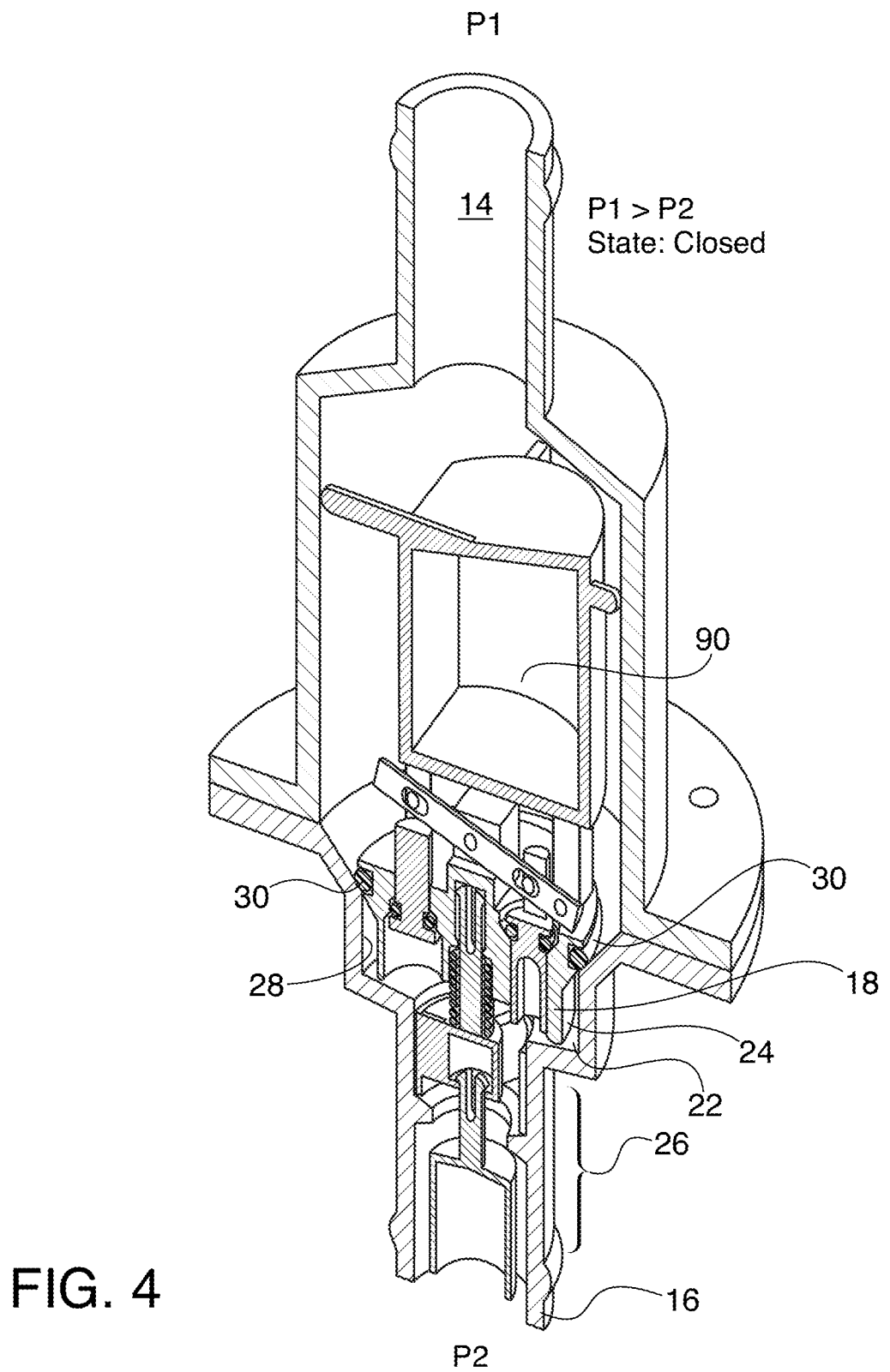
FIG. 4 shows a side perspective cutaway view of a waste water air stop valve where P1>P2, with the valve closed.

As shown by the difference between FIGS. 3 and 4, when the valve 10 experiences a difference between cabin and environment pressures, the movable valve body 18 is caused to move. Specifically, when an aircraft is at flying altitudes, the cabin pressure P1 is greater than the outside environment pressure P2. This higher pressure at the inlet 14 applies pressure to the movable valve body 18, causing compression of the spring 40 as shown by FIG. 4. The higher inlet pressure (P1) forces compression of the spring so that the movable valve body 18 is seated against the lower ledge 22 of the housing 12. Once seated, the sealing member 30 of the body 18 abuts an inwardly slanting wall of the lower ledge 22 to create a secure seal. This puts the valve 10 in a second position. As described below, further movement of components within the movable valve body 18 may still allow fluid to exit the valve 10, but the valve 10 is closed to prevent a rush of air from escaping through the outlet 16. Fluid may not escape past the seal 30/ledge 22 interface in this configuration. An o-ring or other type of sealing member 30 may be provided along the movable valve body 18 at the interface between body 18 and lower ledge 22. This can create a tight seal therebetween to prevent the escape of air along sides 24. When the movable valve body 18 seal 30 sits flush against the wall of the lower ledge 22, the conduit portion 26 leading to the outlet 16 is initially closed.

Referring back to FIGS. 1 and 2, the movable valve body 18 has first and second openings 50, 52 therein. Positioned within and movable longitudinally (in the figures, up and down) with respect to these openings 50, 52 are first and second pistons 54, 56. The first and second pistons 54, 56 have generally equal piston surface areas, such that although connected via member 60, without any external pressure or force, they are generally balanced and cancel one another out. Due to this balance, slight pressure or force or imbalance on one piston can create relative movement of the other piston, as described below. Motion of each piston is independent of the other, in an opposite direction, due to their connection via member 60.

Figure 14:
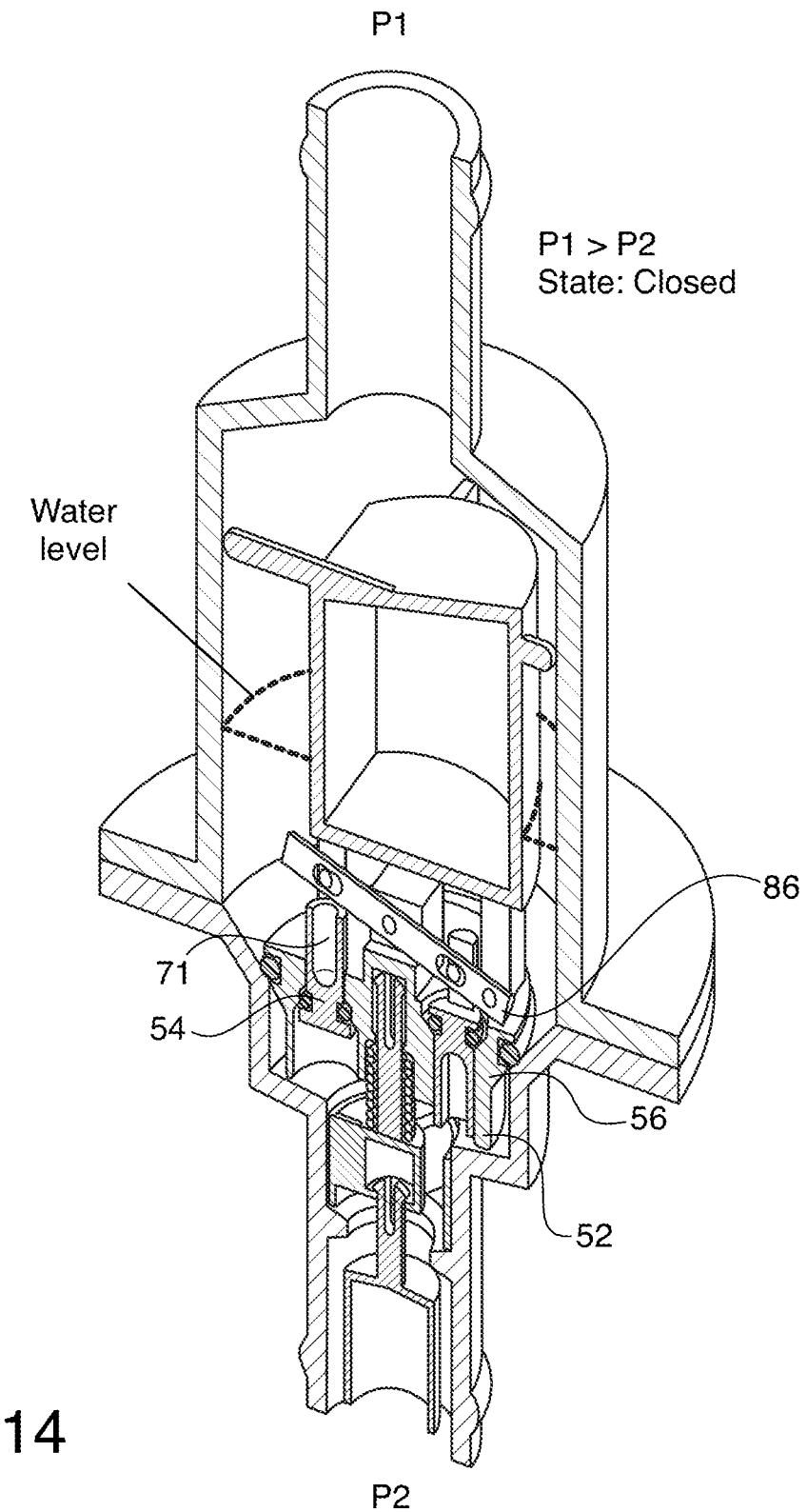
FIG. 14 shows a side perspective cutaway view of a waste water air stop valve closed, illustrating the first piston as also having a fluid channel.

The first piston 54 is shown as having a generally solid body. First piston 54 has an upper end 58 that is hingedly secured to one end of a member 60. Lower end 62 of the first piston 54 is shaped to nest within an upper shoulder 64 of the first opening 50 when the first piston 54 is in its raised position in the first opening 50. When the first piston 54 is in its lowered position, the first opening 50 remains closed to fluid flow. In one example, lower end 62 defines a lower flange 66. An o-ring or other seal member 68 is positioned immediately above the lower flange 66 at the point at which the lower end 62 and the shoulder 64 abut when the first piston 54 is in its raised position. This shape and configuration prevents water or air from passing through the first piston 54. In an alternate example, the first piston may be provided with a fluid channel 71 or hollow portion therethrough, similar to that described below for the second piston 56. This embodiment is illustrated by FIG. 14. It is thus possible for only one piston to be provided with a fluid channel or for both pistons to be provided with a fluid channel.

The second piston 56 is shown as having a channel 70 therethrough within its body. The channel 70 is configured to allow liquid to pass by the second piston 56 when in a raised configuration. Additionally or alternatively, the second piston 56 (and/or the first piston) may be provided with any other feature that allows fluid to flow past the piston and subsequently out of the housing 12. Second piston 56 has an upper end 72 that is also hingedly secured to an opposite end of member 60. The upper end 72 also defines an upper flange 74 that is shaped to nest within an upper shoulder 76 of the second opening 52 when the second piston 56 is in its lowered position in the second opening 52. When the second piston 56 is in its lowered position, second opening 50 remains closed to fluid flow. In one example, an o-ring or other seal member 80 is positioned immediately below the upper flange 74 at the point at which the upper flange 74 and the upper shoulder 76 abut when the second piston 56 is in its lowered. This shape and configuration prevents water or air from passing through the second piston 56 when it is in the lowered position. However, when the second piston 56 is raised (in the configuration illustrated by FIG. 6, as described below), liquid is allowed to pass through the channel 70 of the second piston 56 or otherwise past and through the second opening 52. This configuration allows fluid to drain through the housing 12 and out through the outlet 16.

As illustrated, a member 60 is secured at a first end 84 to the upper end 58 of the first piston 54 at a first securement point 88. A second end 86 of the member 60 is secured to upper end 72 of the second piston 56 at a second securement point 89. The second end 86 of the member 60 is also secured to an upper float 90 at a float securement point 92. Although the float securement point 92 is illustrated as being at the very far end of the member 60, it should be understood that the second securement point 89 and the float securement point 92 may be interchanged positionally. In general, both securement points 89 and 92 should be positioned generally away from the central hinge point 94 of the member 60. The central hinge point 94 is secured to a central area on the movable valve body 18. The central hinge point 94 provides a pivot point for movement of the member 60, which allows movement of the pistons independent from one another.

Figure 6:
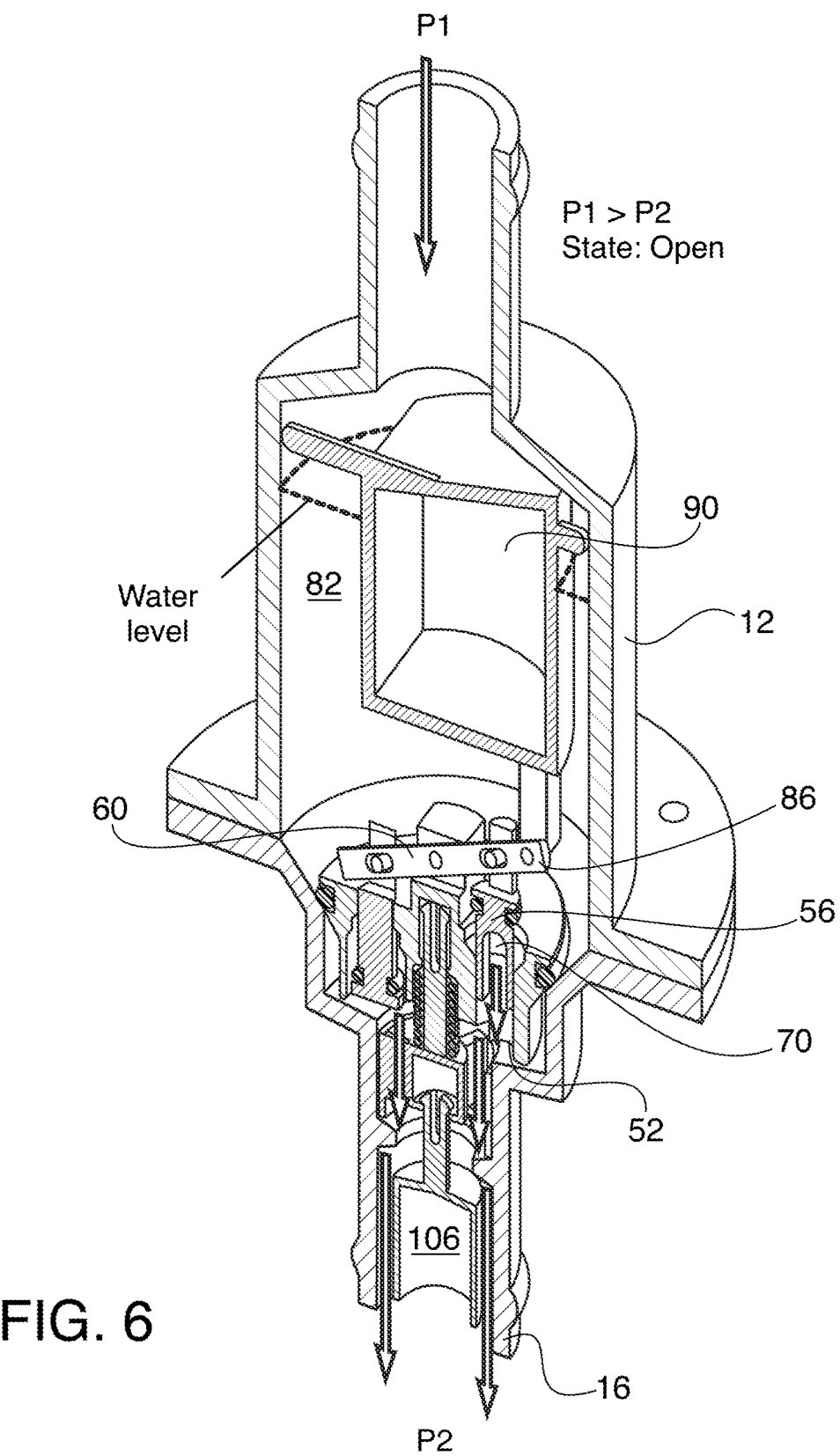
FIG. 6 shows a side perspective cutaway view of a waste water air stop valve with the valve cavity filled with fluid, and with the second piston in a raised position.

Because the member 60 is secured at one end to the float 90, movement of the float 90 creates a consequent see-saw-like movement of the member 60. For example, if water is present in the housing cavity 82 to a level that causes the float 90 to rise, second end 86 of the member 60 is pulled upward. (FIG. 6.) The upper float 90 may be made out of any appropriate material that allows the float 90 to become buoyant at the desired water level. In one specific example, the float 90 has a weight that allows it to float on water. Upward movement of the member second end 86 due to float buoyancy also causes upward movement of the second piston 56. Upward movement of the second piston 56 allows water to flow through the channel 70, creating a drain. The benefit of this configuration is that water is allowed to drain, but air is not allowed to exit.

The exploded view of FIG. 2 illustrates additional details of how the components cooperate with one another. The upper float 90 is illustrated as having an attachment extension 96 that is secured to the member 60 at the float securement point 92. This figure also illustrates a support 98, which is received by opening 20 in the movable valve body 18. In this example, the spring 40 is supported on an extension 102 of the support 98. The support 98 also has a cooperating portion 104 that is configured to receive a lower float 106. In the example shown, the cooperating portion 104 is an opening in the support 98. The lower float 106 is illustrated as having an extension 108 that is received by and cooperates with the cooperating portion 104 of support 98. The purpose of the lower float 106 is for backflow prevention, described further below.

The functioning of the valve 10 will now be described with reference to FIGS. 3-8. As discussed above, FIG. 3 illustrates the valve system when P1=P2. In this configuration, movable valve body 18 is not seated within the lower ledge 22. Any fluid contained within the housing 12 (shown by arrows) is allowed to flow along the body sides 24. As illustrated by FIG. 4, when the aircraft cabin (on the side of P1) is more highly pressurized in the aircraft exterior (on the side of P2) so that P1>P2 (which occurs when cabin pressure P1 at the inlet 14 becomes greater than atmospheric pressure P2 at the outlet 16, creating a negative pressure at the outlet), the pressure on the valve 10 forces the movable valve body 18 downward, to its seated position within the lower ledge 22 of the housing due to the higher pressure P1. In this configuration, the valve 10 is closed to both gas and liquid or other fluids.

Figure 5:
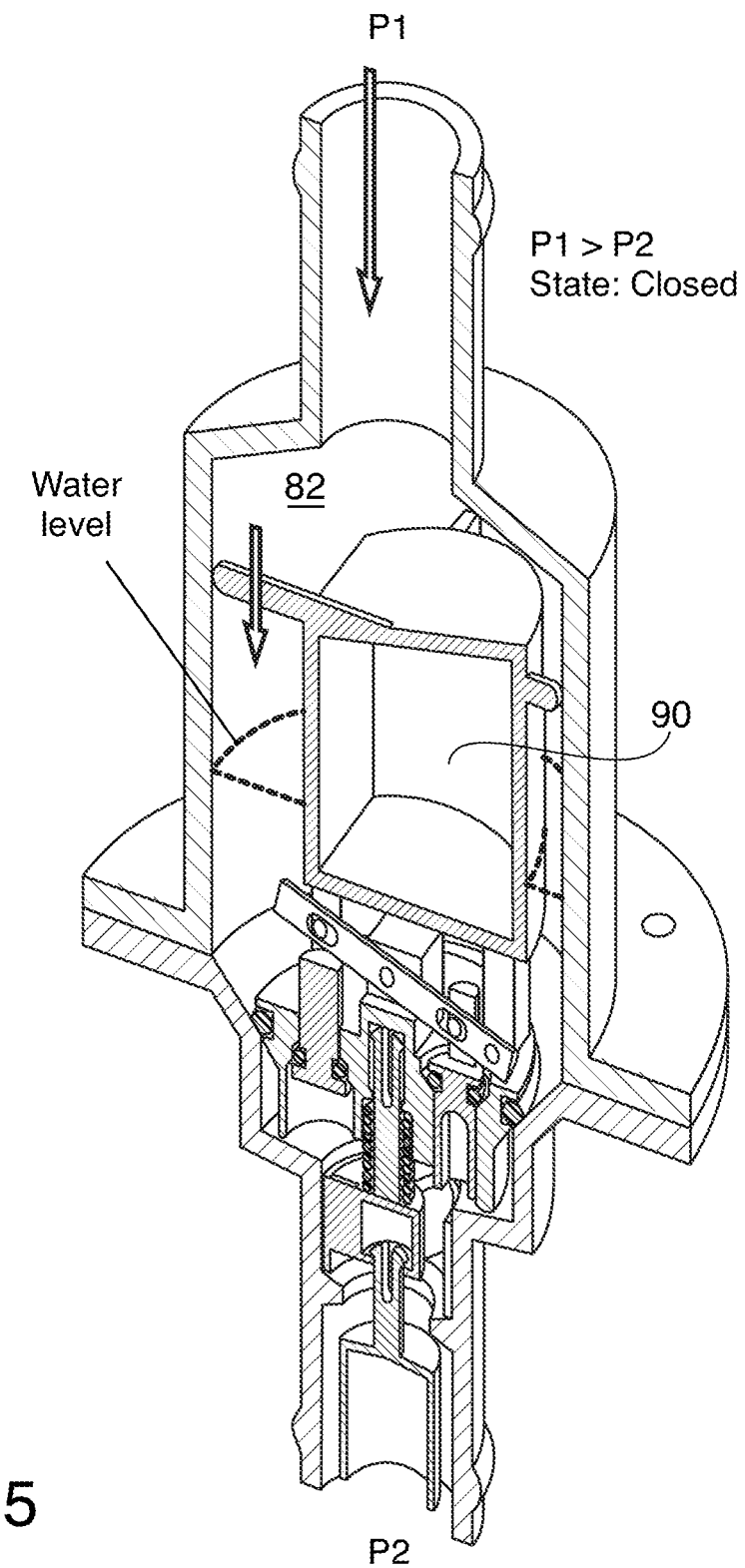
FIG. 5 shows a side perspective cutaway view of a waste water air stop valve with the valve filling with fluid.

When water or other liquid initially enters the inlet 14 as shown in FIG. 5, the valve 10 stays closed until the water level reaches a level at which the upper float 90 becomes buoyant enough to float, shown in FIG. 6. The buoyant float 90 due to the raised water level pulls the second end 86 of the member 60 upward within the housing 12. This upward movement of the member 60 causes consequent upward movement of the second piston 56. As second piston 56 moves longitudinally upward within the second opening 52, liquid is allowed to flow into the second opening 52, through the channel 70 of the second piston 56, and leave through the outlet 16. As illustrated by the arrows, liquid flows down and around the sides of the lower float 106. This will be the status of the valve 10 as long as the water level is such that the upper float 90 is caused to be buoyant.

Figure 7:
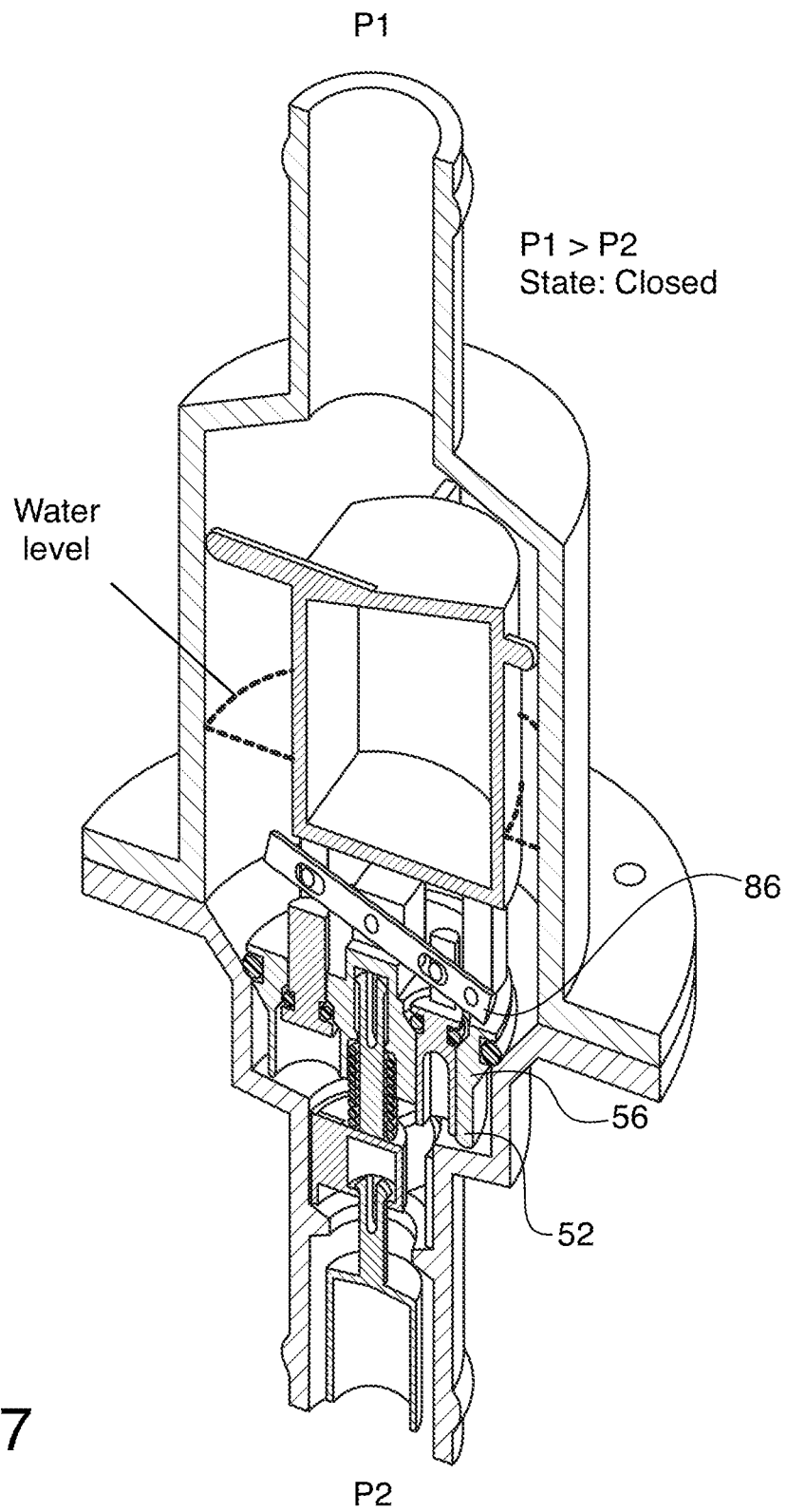
FIG. 7 shows a side perspective cutaway view of a waste water air stop valve closed after liquid has partially passed, illustrating the second piston in a lowered/closed position.

As shown by FIG. 7, when the water level begins to lower again (e.g., the sink or sump has stopped collecting and draining water), the upper float 90 begins to lower within the housing. This can cause a lowering of the second end 86 of member 60 and seating of the second piston 56 within the second opening 52 in order to close the second opening 52.

Figure 8:
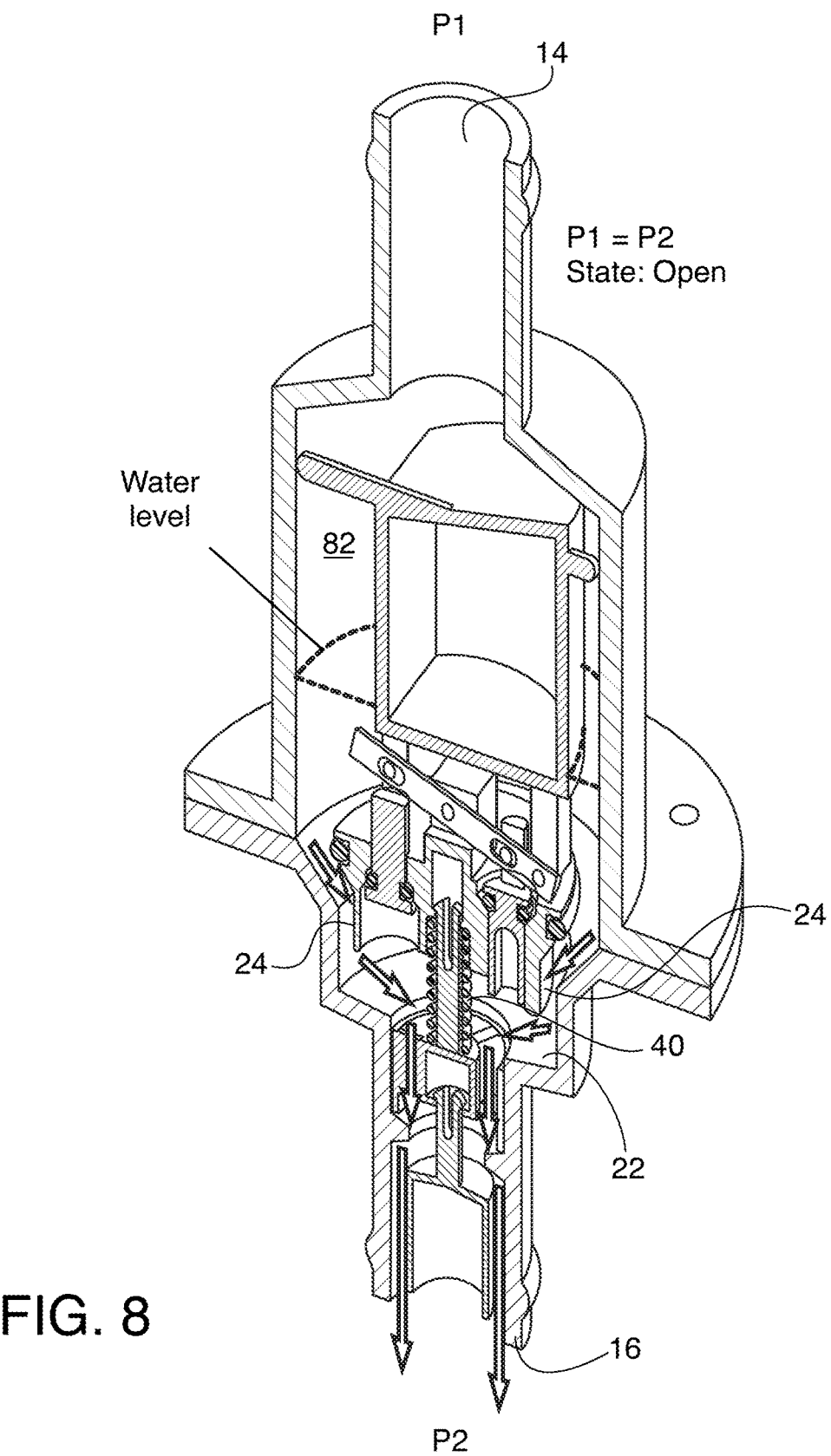
FIG. 8 shows a side perspective cutaway view of a waste water air stop valve with the valve open, pressure being P1=P2, while water is being released.

As shown by FIG. 8, when negative pressure is released, for example when the aircraft reaches ground-level or lands, the pressure force on the movable valve body 18 is released. The valve is returned to its neutral pressure state, raised away from lower ledge 22. The spring 40 expands, and water that may be remaining in the housing cavity 82 (or entering the inlet 14) is allowed to flow along the sides 24 of the movable valve body 18 and exit through outlet 16.

Figure 9:
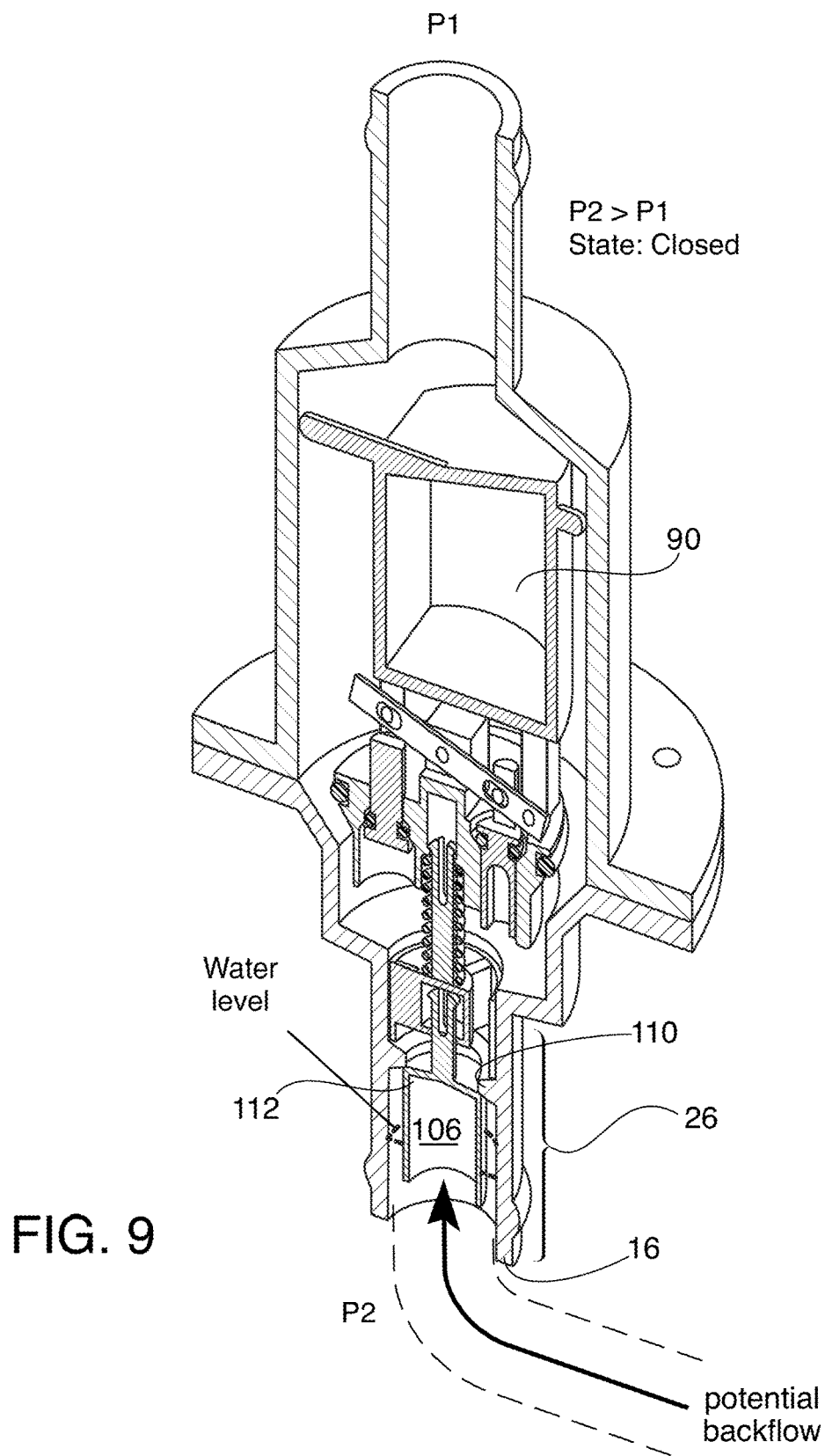
FIG. 9 shows a side perspective cutaway view of a waste water air stop valve with the backstop flow prevention system activated.

The valve 10 is also designed to help prevent backflow. A backflow prevention system is illustrated by FIG. 9. Because a number of sinks or sumps with valves 10 are connected to one another via a series of water line conduits within an aircraft water system, it is conceivable that one of the water line conduits may become clogged. In this instance, without a backflow prevention system, water or other fluids could flow back up into the sinks or sumps that are to be drained, creating a potential and undesirable flooding hazard onboard the aircraft. The valve 10 disclosed herein is accordingly designed to prevent such occurrences. In the instance of a backup or clog, the fluid seeking to flow back up through the conduits and out the sink or sump applies an upward pressure on the lower float 106. The upward buoyancy of the float 106 causes it to block the outlet 16, preventing backflow of liquid from reversing back into the valve 10 and into the sink or sump.

In the specific example shown, the outlet conduit portion 26 is provided with an internal flange 110. In regular valve in use, the first float 106 remains below the internal flange 110. This allows liquid to flow through conduit portion 26, around the internal flange 110, and out the outlet 16. If however, a fluid backflow applies pressure to the lower float 106, and upper portion 112 of the float 106 will abut the internal flange 110, creating a seal. This will happen regardless of the pressure differential between the inlet 14 and the outlet 16.

Figure 10:
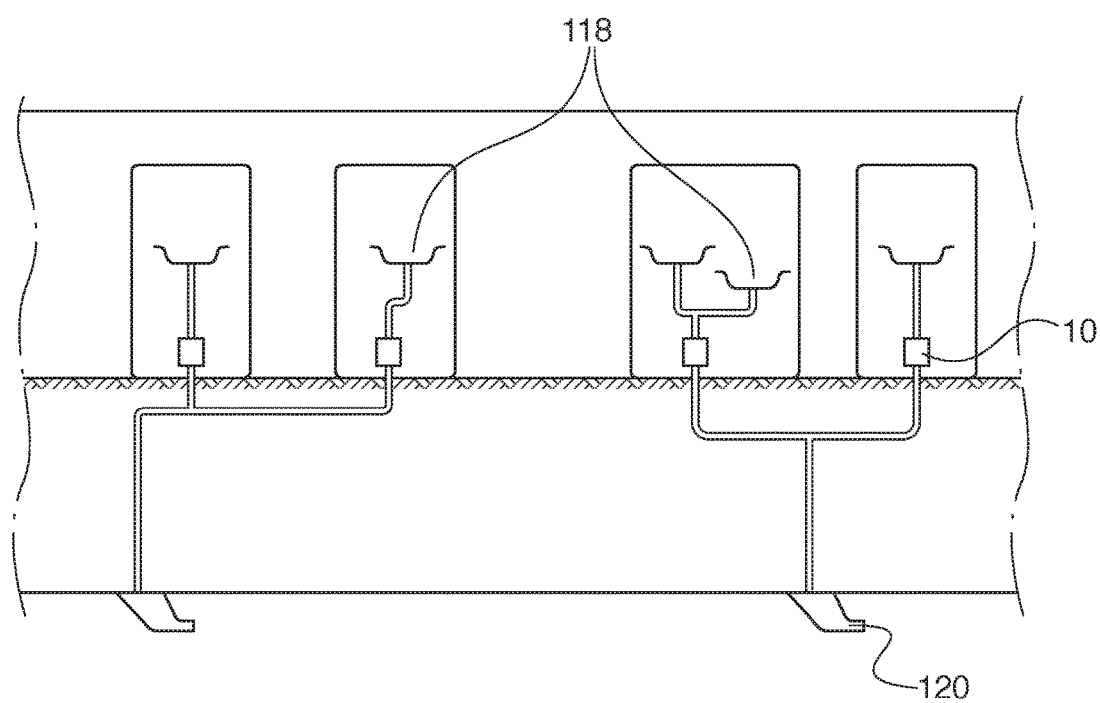
FIG. 10 shows a front plan schematic view of potential locations of waste water air stop valves draining to a drain mast in an aircraft.

As shown by FIG. 10, The valve 10 will generally be positioned between a sink/sump 118 or any other liquid generating device and the drain mast 120 of the aircraft. It is generally envisioned that one valve 10 per sink/sump will be provided. However, multiple valves 10 may drain to a single drain mast. It should be understood that it is also possible to route the drained fluid elsewhere on the aircraft. For example, the exiting fluid may be drained or routed to a grey water holding tank or reservoir, to a grey water cleaning station, to the main waste water tank, or elsewhere as desired.

In one embodiment is possible to provide a manual override. The manual override may be connected to the upper float 90 and/or to the member 60 and/or any other components associated with the member 60 (for example, hinge 89) and/or the movable valve body 18 in order to enable opening of the valve manually.

Figure 11:
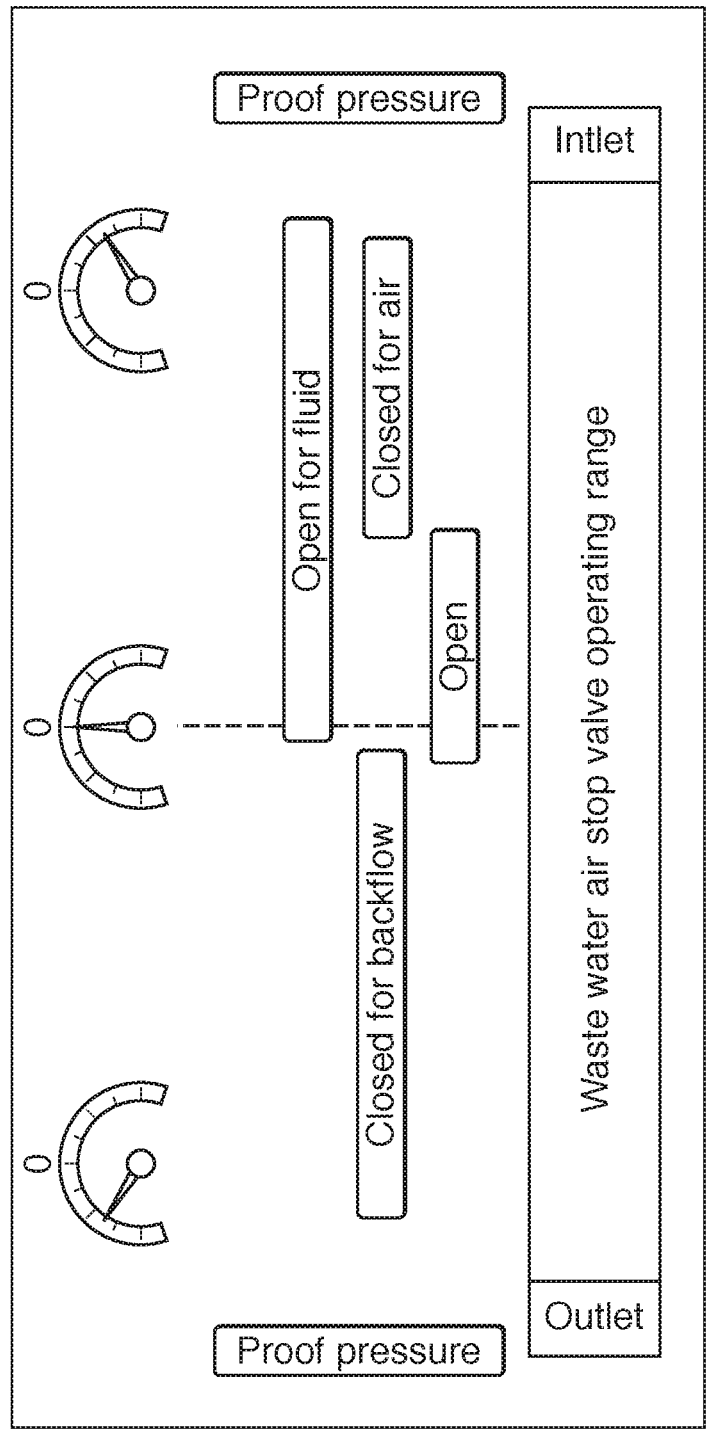
FIG. 11 is a schematic illustrating open and closure options of a waste water air stop valve.
Figure 12:
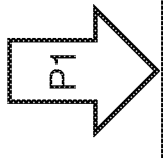
FIG. 12 is a schematic illustrating various pressure conditions, aircraft conditions, waste state conditions, and outside environment conditions as they relate to one another in connection with the waste water air stop valve disclosed herein.
Figure 13:
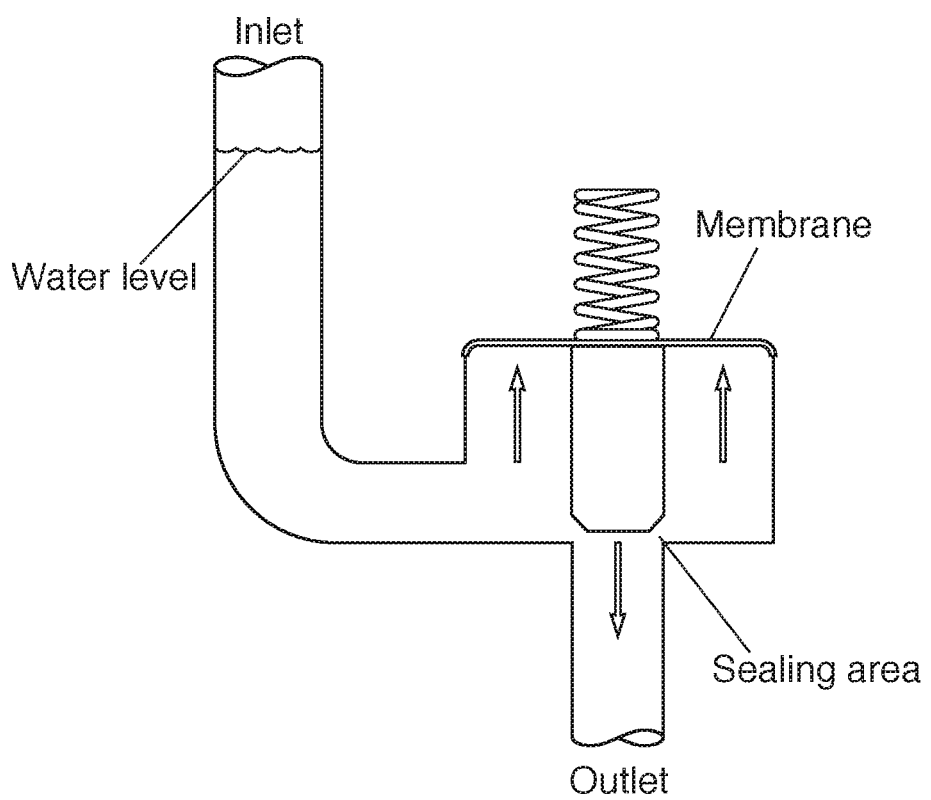
FIG. 13 shows a side plan view of a prior art valve, requiring a water column and a membrane.

FIG. 11 illustrates a schematic showing various pressure situations for the water enters the valve operating range. FIG. 12 illustrates a schematic showing a high-level function description of how various conditions relate to one another for the valve state, including pressure condition across the inlet and outlet of the valve, aircraft cabin pressure (P1), valve state, and outside environment pressure (P2).

EXAMPLE A

In one example, there is provided a waste water air stop valve, comprising: a housing comprising an inlet and an outlet; a movable valve body positioned to open or close the outlet, depending upon a pressure condition differential between the inlet and the outlet; the movable valve body comprising first and second openings, the first opening supporting a first piston and the second opening supporting a second piston, the first and second pistons associated via a member having a first end operably connected to the first piston and a second end operably connected to the second piston, wherein raised movement of the first end of the member causes raising of the first piston and lowering of the second piston, wherein raised movement of the second end of the bar causes raising of the second piston and lowering of the first piston; the member secured to a float at a securement point, the securement point positioned closer to the second end of the bar than the first; wherein fluid entering the inlet accumulates in a housing cavity until the fluid reaches a level that causes flotation of the float, wherein flotation of the float causes raising of the securement point end of the bar, causing raised movement of the second piston, wherein raised movement of the second piston allows fluid to flow past the second piston and through the outlet.

EXAMPLE B

The valve of any of the preceding or subsequent examples, wherein the second piston comprises a channel therethrough.

EXAMPLE C

The valve of any of the preceding or subsequent examples, wherein fluid is allowed to pass via the first piston, the second piston, or both.

EXAMPLE D

The valve of any of the preceding or subsequent examples, wherein both the first piston and the second piston comprise a channel therethrough.

EXAMPLE E

The valve of any of the preceding or subsequent examples, wherein the second piston comprises an upper flange that abuts an upper shoulder of the movable valve body when the second piston is in a closed position.

EXAMPLE F

The valve of any of the preceding or subsequent examples, wherein the movable valve body comprises a sealing member configured to abut an internal wall of the housing when the movable valve body is in a closed position.

EXAMPLE G

The valve of any of the preceding or subsequent examples, wherein the housing comprises a lower ledge.

EXAMPLE H

The valve of any of the preceding or subsequent examples, wherein when pressure at the inlet is equal to pressure at the outlet, the movable valve body is raised from the lower ledge.

EXAMPLE I

The valve of any of the preceding or subsequent examples, wherein when pressure at the inlet is a greater than pressure at the outlet, the movable valve body is seated with respect to the lower ledge.

EXAMPLE J

The valve of any of the preceding or subsequent examples, further comprising a spring to bias the movable valve body in an open position.

EXAMPLE K

The valve of any of the preceding or subsequent examples, wherein a higher pressure at the inlet than at the outlet causes compression of the spring and movement of the movable valve body to a closed position.

EXAMPLE L

The valve of any of the preceding or subsequent examples, further comprising a spring to cause raised and lowered movement of the movable body depending upon pressure at the inlet and outlet.

EXAMPLE M

The valve of any of the preceding or subsequent examples, wherein the member comprises a central hinge point secured to the movable valve body.

EXAMPLE N

The valve of any of the preceding or subsequent examples, further comprising a backflow prevention system.

EXAMPLE O

The valve of any of the preceding or subsequent examples, wherein the backflow prevention system comprises a lower float configured to block the outlet when buoyant.

EXAMPLE P

The valve of any of the preceding or subsequent examples, wherein the backflow system comprises an internal flange along a conduit portion of the outlet and a lower float, wherein backflow fluid applying water pressure to the lower float causes the lower float to raise and abut the internal flange, blocking the outlet.

EXAMPLE Q

The valve of any of the preceding or subsequent examples, wherein each of the first and second pistons comprises an o-ring seal.

EXAMPLE R

The valve of any of the preceding or subsequent examples, further comprising a manual override option.

EXAMPLE S

A method for using the valve of any of the preceding or subsequent examples, comprising providing a waste water air stop valve having any of the above described features or combination thereof; draining fluid from a sink or sump into the inlet; and directing fluid leaving the outlet to an aircraft drain mast.

Changes and modifications, additions and deletions may be made to the structures and methods recited above and shown in the drawings without departing from the scope or spirit of the disclosure or the following claims.

What is claimed is:

1. A waste water air stop valve, comprising:
a housing comprising an inlet and an outlet;
a movable valve body positioned to open or close the outlet, depending upon a pressure condition differential between the inlet and the outlet;
the movable valve body comprising first and second openings, the first opening supporting a first piston and the second opening supporting a second piston,
the first and second pistons associated via a member having a first end operably connected to the first piston and a second end operably connected to the second piston, wherein raised movement of the first end of the member causes raising of the first piston and lowering of the second piston,
wherein raised movement of the second end of the member causes raising of the second piston and lowering of the first piston;
the member secured to a float at a securement point, the securement point positioned closer to the second end of the member than the first;
wherein fluid entering the inlet accumulates in a housing cavity until the fluid reaches a level that causes flotation of the float, wherein flotation of the float causes raising of the securement point end of the member, causing raised movement of the second piston, wherein raised movement of the second piston allows fluid to flow past the second piston and through the outlet.

2. The valve of claim 1, wherein the second piston comprises a channel therethrough.

3. The valve of claim 2, wherein fluid is allowed to pass via the first piston, the second piston, or both.

4. The valve of claim 1, wherein both the first piston and the second piston comprise a channel therethrough.

5. The valve of claim 1, wherein the second piston comprises an upper flange that abuts an upper shoulder of the movable valve body when the second piston is in a closed position.

6. The valve of claim 1, wherein the movable valve body comprises a sealing member configured to abut an internal wall of the housing when the movable valve body is in a closed position.

7. The valve of claim 1, wherein the housing comprises a lower ledge.

8. The valve of claim 7, wherein when pressure at the inlet is equal to pressure at the outlet, the movable valve body is raised from the lower ledge.

9. The valve of claim 7, wherein when pressure at the inlet is a greater than pressure at the outlet, the movable valve body is seated with respect to the lower ledge.

10. The valve of claim 1, further comprising a spring to bias the movable valve body in an open position.

11. The valve of claim 10, wherein a higher pressure at the inlet than at the outlet causes compression of the spring and movement of the movable valve body to a closed position.

12. The valve of claim 1, further comprising a spring to cause raised and lowered movement of the movable body depending upon pressure at the inlet and outlet.

13. The valve of claim 1, wherein the member comprises a central hinge point secured to the movable valve body.

14. The valve of claim 1, further comprising a backflow prevention system.

15. The valve of claim 14, wherein the backflow prevention system comprises a lower float configured to block the outlet when buoyant.

16. The valve of claim 14, wherein the backflow system comprises an internal flange along a conduit portion of the outlet and a lower float, wherein backflow fluid applying water pressure to the lower float causes the lower float to raise and abut the internal flange, blocking the outlet.

17. The valve of claim 1, wherein each of the first and second pistons comprises an o-ring seal.

18. The valve of claim 1, further comprising a manual override option.

19. A method for releasing grey water from an aircraft, comprising:
providing the waste water air stop valve of claim 1;
draining fluid from a sink or sump into the inlet;
directing fluid leaving the outlet to an aircraft drain mast.

* * * * *